US010589257B2

(12) United States Patent
Herskowitz et al.

(10) Patent No.: US 10,589,257 B2
(45) Date of Patent: Mar. 17, 2020

(54) CATALYST COMPOSITION AND CATALYTIC PROCESSES FOR PRODUCING LIQUID HYDROCARBONS

(71) Applicant: B.G. Negev Technologies and Applications LTD., at Ben-Gurion University, Beer-Sheva (IL)

(72) Inventors: Mordechay Herskowitz, Beer-Sheva (IL); Miron Landau, Beer-Sheva (IL); Roksana Vidruk, Beer-Sheva (IL); Meital Amouyal, Ashdod (IL)

(73) Assignee: B.G. Negev Technologies and Applications Ltd., at Ben-Gurion University, Beer-Sheva (IL)

(*) Notice: Subject to any disclaimer, the term of this patent is extended or adjusted under 35 U.S.C. 154(b) by 0 days.

(21) Appl. No.: 15/563,700

(22) PCT Filed: Apr. 6, 2016

(86) PCT No.: PCT/IL2016/050364
§ 371 (c)(1),
(2) Date: Oct. 2, 2017

(87) PCT Pub. No.: WO2016/162866
PCT Pub. Date: Oct. 13, 2016

(65) Prior Publication Data
US 2018/0078923 A1   Mar. 22, 2018

Related U.S. Application Data

(60) Provisional application No. 62/143,834, filed on Apr. 7, 2015, provisional application No. 62/143,838, filed on Apr. 7, 2015, provisional application No. 62/188,669, filed on Jul. 5, 2015.

(51) Int. Cl.
*B01J 23/745* (2006.01)
*B01J 23/00* (2006.01)
*B01J 35/02* (2006.01)
*B01J 37/00* (2006.01)
*B01J 35/10* (2006.01)
*B01J 23/02* (2006.01)
*C10G 2/00* (2006.01)
*B01J 37/18* (2006.01)
*B01J 37/03* (2006.01)
*B01J 23/78* (2006.01)
*B01J 37/08* (2006.01)

(52) U.S. Cl.
CPC .......... *B01J 23/745* (2013.01); *B01J 23/005* (2013.01); *B01J 23/02* (2013.01); *B01J 23/78* (2013.01); *B01J 35/023* (2013.01); *B01J 35/1019* (2013.01); *B01J 35/1038* (2013.01); *B01J 35/1061* (2013.01); *B01J 37/0009* (2013.01); *B01J 37/031* (2013.01); *B01J 37/08* (2013.01); *B01J 37/18* (2013.01); *C10G 2/331* (2013.01); *C10G 2/332* (2013.01); *B01J 2523/00* (2013.01)

(58) Field of Classification Search
CPC ........ B01J 23/745; B01J 23/005; B01J 23/02; B01J 23/78; B01J 35/023; B01J 35/1019; B01J 35/1038; B01J 35/1061; B01J 37/0009; B01J 37/031; B01J 37/08; B01J 37/18; C10G 2/331; C10G 2/332
See application file for complete search history.

(56) References Cited

U.S. PATENT DOCUMENTS

| 4,559,363 | A | 12/1985 | Miller et al. |
| 4,565,831 | A | 1/1986 | Wright et al. |
| 4,582,815 | A | 4/1986 | Bowes |
| 5,053,374 | A | 10/1991 | Absil et al. |
| 5,302,622 | A * | 4/1994 | Chaumette ........... B01J 23/8926 518/713 |
| 2009/0111684 | A1 | 4/2009 | Demirel et al. |

FOREIGN PATENT DOCUMENTS

| EP | 1 657 290 A1 | 5/2006 |
| WO | 2014111919 A2 | 7/2014 |

OTHER PUBLICATIONS

Bukur, et al. "Steady state Fischer-Tropsch synthesis in fixed-bed and stirred tank slurry reactors", Catalysis Today (1995) 24, 111-119, Elsevier Science B.V.
Bukur, et al. "Activation Studies with a Promoted Precipitated Iron Fischer-Tropsch Catalyst", Ind. & Eng. Chem. Res. (1989) 28, 1130, American Chemical Society.
Chaffee, et al. "The Kölbel-Engelhardt Reaction Over a Silica Supported Nickel Catalyst. Variation of Product Distributions with Reaction Conditions", Applied Catalysis (1986) 26, 123-139, Elsevier Science Publishers B.V. Amsterdam, The Netherlands.
Das et al. "CO-hydrogenation over silica supported iron based catalysts: Influence of potassium loading", Applied Energy (2013) 111, 267-276, Elsevier Ltd.
Guo, et al. "Dry reforming of methane over nickel catalysts supported on magnesium aluminate spinels", Applied Catalysis A: General (2004) 273, 75-82, Elsevier B.V.
Gustafson et al. "The Catalytic Reactions of CO and H2O over Ruthenium in a Y-Type Zeolite", Journal of Catalysis (1982) 74, 393-404, Academic Press, Inc.
Irani, et al. "The Effects of SiO2 and Al2O3 Binders on the Activity and Selectivity of Bifunctional Fe/HZSM-5 Catalyst in Fischer-Tropsch Synthesis", Iranian Journal of Chemical Engineering, (2008) vol. 5, No. 2, Iranian Association of Chemical Engineers.

(Continued)

Primary Examiner — Melvin C. Mayes
Assistant Examiner — Michael Forrest
(74) Attorney, Agent, or Firm — Ohlandt, Greeley, Ruggiero & Perle, L.L.P.

(57) ABSTRACT

The invention relates to potassium-promoted, $Fe^{2+}(Fe^{3+}_y Al^{3+}_{1-y})2°4$ [$0.3 < y \leq 0.7$] silica-containing extrudates, processes for the preparation of the extrudates with the aid of colloidal silica, and the use of the extrudates to catalyze processes for producing liquid hydrocarbons.

6 Claims, 7 Drawing Sheets

(56) References Cited

OTHER PUBLICATIONS

Landau, et al. "Sustainable Production of Green Feed from Carbon Dioxide and Hydrogen", ChemSusChem (2014) 7, 785-794, Wiley-VCH-Verlag GmbH & Co., KGaA, Weinheim.

Larkins, et al. "Investigation of Kölbel-Englehardt Synthesis over Iron-Based Catalysts", Applied Catalysis, (1989) 47, 209-227, Elsevier Science Publishers B.V. Amsterdam, The Netherlands.

Miyata, et al. "Kinetic and Mechanistic Studies on the Kölbel-Engelhardt Reaction over an Iron Oxide Catalyst", Bulletin of the Chemical Society of Japan, (1984) 57, 667-672, The Chemical Society of Japan.

Shah, et al. "Dry Reforming of Hyrdocarbon Feedstocks", Catalysis Reviews: Science and Engineering, (2014) 56:476-536, Taylor and Francis Group.

Wood, et al. "Gas-to-liquids (GTL): A review of an industry offering several routes for monetizing natural gas", Journal of Natural Gas Science and Engineering (2012) 9, 196-208, Elsevier B.V.

Written Opinion for the corresponding International Application No. PCT/IL2016/050364, 6 pages, dated Jul. 28, 2016.

International Search Report for the corresponding International Application No. PCT/IL2016/050364, 3 pages, dated Jul. 28, 2016.

Extended European Search Report dated Aug. 27, 2018 from corresponding European Patent Application No. 16776222.8, 9 pages.

* cited by examiner

CATALYST COMPOSITION AND CATALYTIC PROCESSES FOR PRODUCING LIQUID HYDROCARBONS

The choice of a catalyst for advancing a chemical reaction is crucially important. We recently reported the hydrogenation of carbon dioxide to hydrocarbons with the aid of potassium-promoted spinel catalyst of the formula $Fe^{2+}(Fe^{3+}_yAl^{3+}_{1-y})_2O_4/K$, wherein y is preferably in the range from 0.3 to 0.7, in a reactor configuration consisting of a plurality of fixed-bed reactors arranged in series [WO 2014/111919; M. V. Landau, R. Vidruk, and M. Herskowitz, *ChemSusChem*, 2014, 7, 785-794].

Industrial catalysts are rarely used as powders; they are usually employed as entities of larger size and/or better defined shapes, e.g., in the form of pellets, to prevent an unacceptably high pressure drop in gas-phase reactions in packed beds. The term "pellet" is used herein to indicate any discrete solid form created from powdered material by means of forming operations, typically through the application of pressure or compaction, for example, using an extruder to form extrudates, or a press to produce tablets or by granulation methods.

We tested the performance of binder-free pellets produced by forming $Fe^{2+}(Fe^{3+}_yAl^{3+}_{1-y})_2O_4/K$ powder into granules and binder-containing pellets obtained with the aid of alumina as a binder (as illustrated in Example 29 of WO 2014/111919, where a portion of a desired amount of the potassium promoter is added to the spinel powder and the remaining portion to the pellets). Although both types of pellets give fairly good results, a decrease in performance was observed when the alumina binder-containing pellets were used. Overall, the alumina-containing pellets are mechanically stronger, but in their presence, the selectivity of the reaction to the valuable $C_{5+}$ hydrocarbons, and especially to $C_{7+}$ hydrocarbons is unfortunately lower than the activity measured for a parallel reaction using the binder-free pellets.

It has now been found that on using silica as a binder in place of alumina, it is possible to produce via carefully chosen conditions potassium-promoted $Fe^{2+}(Fe^{3+}_yAl^{3+}_{1-y})_2O_4$, silica-containing pellets, in particular extrudates, which are not only mechanically strong, but also display high catalytic activity, surpassing that of the binder-free pellets.

In particular, an extrudable mass was achieved on combining the catalyst $Fe^{2+}(Fe^{3+}_yAl^{3+}_{1-y})_2O_4$ with colloidal silica as the sole silica source, in a specific pH environment, more precisely, around neutral pH values. Extrusion of silica-rich solids, consisting of silica, zeolite or a mixture thereof to form extrudates with an acceptable physical strength is described in U.S. Pat. Nos. 4,582,815 and 5,053,374.

Briefly, the preparation method according to the invention involves the gelation of a colloidal silica in the presence of $Fe^{2+}(Fe^{3+}_yAl^{3+}_{1-y})_2O_4$ particles at a suitable pH, preferably in the range from 6.5 to 7.5, more preferably from 6.8 to 7.2. The so-formed gelled material is optionally dried, to give an extrudable mass with an acceptable moisture content, preferably from 40 to 45% (by weight), which is then formed into pellets (extrudates). The resultant extrudates, after aging and drying, undergo a first calcination, followed by impregnation with potassium solution, and are then dried and calcined again, to give potassium-promoted $Fe^{2+}(Fe^{3+}_yAl^{3+}_{1-y})_2O_4$ silica-containing extrudates with high mechanical strength and greatly improved catalytic activity which can find utility in a variety of processes of hydrocarbons production from carbon dioxide, that is, the reaction of carbon dioxide with hydrogen (produced by water splitting or by steam reforming of natural gas or other sources) to produce hydrocarbons, the reaction of carbon monoxide (produced by carbon dioxide splitting or other sources) with steam to produce hydrocarbons and conversion of $H_2$-lean syngas (obtainable by dry reforming of natural gas or other sources) to hydrocarbons. The features of these processes are set out in detail below.

Accordingly, a first aspect of the invention is a process for preparing potassium-promoted $Fe^{2+}(Fe^{3+}_yAl^{3+}_{1-y})_2O_4$, silica-containing pellets [$0.3 \leq y \leq 0.7$, preferably $0.4 \leq y \leq 0.6$], comprising subjecting colloidal silica to gelation in the presence of $Fe^{2+}(Fe^{3+}_yAl^{3+}_{1-y})_2O_4$ spinel particles, converting the gelled material into pellets and adding potassium to said pellets. The weight ratio Fe:Al:K in the catalyst preferably varies from 100:20:3 to 100:30:20.

The active catalytic material $Fe^{2+}(Fe^{3+}_yAl^{3+}_{1-y})_2O_4$ is prepared by a co-precipitation technique described in detail in WO 2014/111919. On dissolving at least one ferric compound and at least one aluminum compound in water and adjusting the pH of the solution, e.g., to about 6.0-8.5, preferably with the aid of ammonium hydroxide, the co-precipitation of the metals takes place to give the corresponding mixed hydroxides which on drying undergo dehydration whereby a spinel compound is formed, which is preferably free of a hematite or magnetite phases after calcination.

Suitable starting materials for use in the preparation of the $Fe^{2+}(Fe^{3+}_yAl^{3+}_{1-y})_2O_4$ catalyst are water-soluble ferric and aluminum salts, such as the nitrate salts. The two metal nitrates exist in hydrated forms: $Fe(NO_3)_3 \cdot 9H_2O$ and $Al(NO_3)_3 \cdot 9H_2O$. The preferred concentrations of the ferric and aluminum salts in the aqueous solution are from 400 to 1200 g/liter and 200-600 g/liter and, respectively, with the relative amounts of the salts being adjusted to form the desired composition of the catalyst. The water-soluble metal salts, e.g., the nitrates, can be added to the aqueous solution in a solid form in any desired order, or can be pre-dissolved in separate solutions, which are subsequently combined together. Preferably, the weight ratio Al:Fe in the solution is not less than 20:100, e.g., from 20:100 to 30:100.

The adjustment of the pH of the aqueous solution to the range from 6.0 to 8.5, especially between 7.5 and 8.5, e.g., around 8.0, in order to induce the co-precipitation of the metal hydroxides, is preferably accomplished by the gradual addition of an aqueous base solution, such as ammonium hydroxide solution, which solution is preferably applied in a dilute form, with concentration of not more than 5% by weight. Working with Al:Fe weight ratio as set out above and carefully basifying the solution with the aid of dilute alkaline solution ultimately affords on drying-calcination the desired hematite-free $Fe^{2+}(Fe^{3+}_yAl^{3+}_{1-y})_2O_4$ spinel.

The precipitate formed is separated from the mother liquor, e.g., by filtration or any other solid/liquid separation technique, optionally washed with water and then dried at temperature in the range of 100-140° C. for period of at least 3 hours, e.g., at least 6 hours.

To form the silica-containing pellets of the invention, the spinel compound is combined with a suitable silica precursor. To this end, a reduced-particle size form of the spinel material is preferably employed. Particle size reduction could be achieved using conventional methods, e.g., with the aid of a milling device such as a ball mill. Preferably, the $Fe^{2+}(Fe^{3+}_yAl^{3+}_{1-y})_2O_4$ compound is milled to produce a population of particles (nanocrystalline aggregates) with particle size of less than 250 μm, preferably from 20 to 200 μm, as determined, for example, by laser light scattering (laser diffraction) method.

Next, $Fe^{2+}(Fe^{3+}_yAl^{3+}_{1-y})_2O_4$ particles with particle size as set forth above are mixed with a suitable silica precursor. We have found that a silica precursor useful as a starting material in the preparation of the pellets is an aqueous alkali-stabilized colloidal silica with amorphous silica particle size of up to 100 nm, preferably up to 50 nm, e.g., from about 10 to 20 nm (nominal size), with the content of the silica in the dispersion varying from 20 to 40% by weight. Suitable colloidal silica are commercially available (for example, Ludox® HS originally from E I Du Pont de Nemours & Co and now from Grace & Co; two preferred grades are Ludox® HS-30 and Ludox® HS-40 which contain 30% and 40% silica, respectively). Preferably, the amount of colloidal silica is from 90 to 100% weight percent of the total amount of silica used in the process; preferably, only colloidal silica is used as a silica source in forming the extrudates of this invention.

To trigger the gelation process, the pH of the colloidal silica is reduced by the addition of a mineral acid, such as concentrated nitric acid, although other acids may also be used. The pH of the system is reduced to within the range of below the alkaline pH threshold necessary to stabilize the colloidal silica starting material. However, setting the pH of the colloidal silica too low within the acidic regime can damage the structure of the spinel powder (the spinel is incompatible with either highly basic or acidic environment). Hence, a suitable pH window exists around neutral pH, e.g., from about 6.5 to 7.5, preferably from 6.8 to 7.2.

Having adjusted the pH of the colloidal silica accordingly, the $Fe^{2+}(Fe^{3+}_yAl^{3+}_{1-y})_2O_4$ powder is combined with the silica dispersion. The weight ratio $Fe^{2+}(Fe^{3+}_yAl^{3+}_{1-y})_2O_4/SiO_2$ in the mixture is preferably from 50:50 to 80:20, e.g., 55:45 to 75:25, more preferably from 65:35 to 75:25. On maintaining the mixture under mixing/kneading at temperature of 20-80° C. for at least three hours (preferably 3-6 hours at elevated temperatures and 20-24 hours at room temperature), a gel is formed. The $Fe^{2+}(Fe^{3+}_yAl^{3+}_{1-y})_2O_4/SiO_2$-containing gel is optionally dried under kneading to adjust the consistency of the mass (e.g., to achieve water content of about 40-45 wt %), taken out from the vessel (kneader) and formed into pellets using conventional methods, including extrusion to produce extrudates or inserting in a perforated plate. The extrudates may be produced in different shapes and sizes; for example, cylindrical extrudates with diameter of 1.5-2.5 mm and length in the range from 3 to 15 mm.

Preferably, the invention provides extrudates, using an apparatus customary for this purpose, that is, extruders including single-screw or twin-screw extruders which can be co-rotating or counter-rotating. For example, the mass is fed through the feed inlet of an extruder and extruded through a die plate containing 2-4 mm diameter holes.

The pellets (e.g., extrudates) are aged in air at room temperature for period of not less than 5 h, e.g., not less than 15 h, dried, e.g., in air at a temperature of not less than 100° C. for a period of time of not less than 3 hours, e.g., not less than 6 hours, and then calcined in air at a temperature in the range from 300 to 400° C. for not less than 3 hours. It is noted that the catalytically active material $Fe^{2+}(Fe^{3+}_yAl^{3+}_{1-y})_2O_4$ distributed within the pellet (e.g., extrudates) is essentially free of hematite or magnetite phases.

Next, potassium is loaded onto the pellets (e.g., extrudates) It should be noted that the potassium promoter may also be added to the catalyst at one of the early stages of the process, e.g., a portion of the desired amount of the promoter may be added to the $Fe^{2+}(Fe^{3+}_yAl^{3+}_{1-y})_2O_4$ powder or to the $Fe^{2+}(Fe^{3+}_yAl^{3+}_{1-y})_2O_4/SiO_2$-containing gel. However, experimental work conducted in support of this invention indicates that the performance of the pellets (e.g., extrudates) is strongly influenced by the addition of the promoter and that catalytic compositions with greatly improved catalytic activity are produced when the addition of the promoter is delayed until after pellet calcination, e.g., at least 80%, and preferably from 80 to 100% of the desired amount of the promoter is added via 'post-calcination route', whereby the calcined pellets (e.g., extrudates) are treated with an aqueous solution of a potassium salt to ensure sufficient uptake of the promoter in the pellets, e.g., the pellets (extrudates) are impregnated with a solution of potassium carbonate, nitrate or acetate until incipient wetness is observed. The impregnation-drying cycle may be repeated several times. In general, in the pellets (e.g., extrudates) of the invention, the weight ratio Fe:K is in the range from 100:3 to 100:20, for example, more than 100:10 and up to 100:18.

The potassium-containing pellets (e.g., extrudates) are subjected to drying in air at a temperature in the range of 100-140° C. for period of at least 3 hours, e.g., at least 6 hours followed by calcination in air at a temperature in the range from 400 to 500° C. for period of at least 3 hours, e.g., at least 6 hours.

Accordingly, the invention specifically relates to a process for preparing potassium-promoted $Fe^{2+}(Fe^{3+}_yAl^{3+}_{1-y})_2O_4$, silica-containing extrudates, comprising the following steps:

(i) lowering the pH of an aqueous alkali-stabilized colloidal silica;
(ii) combining said colloidal silica with $Fe^{2+}(Fe^{3+}_yAl^{3+}_{1-y})_2O_4$ particles [$0.3 \leq y \leq 0.7$, preferably $0.4 \leq y \leq 0.6$];
(iii) allowing the mixture resulting from step (ii) to transform into a gel;
(iv) adjusting the consistency of said gel to obtain an extrudable mass;
(v) extruding said mass to form extrudates;
(vi) drying the extrudates;
(vii) calcining the dried extrudate;
(viii) treating the calcined extrudates with an aqueous solution of a potassium salt;
(ix) drying the potassium-containing extrudates resulting from step (viii); and
(x) calcining the extrudates resulting from step (ix).

The resultant potassium-promoted $Fe^{2+}(Fe^{3+}_yAl^{3+}_{1-y})_2O_4$, silica-containing pellets (e.g., extrudates) form another aspect of the invention. Compositionally, the pellets (e.g., extrudates) comprise 45 to 85% by weight $Fe^{2+}(Fe^{3+}_yAl^{3+}_{1-y})_2O_4$, 10-50% by weight $SiO_2$ and 3 to 10% by weight potassium. Preferably, the extrudates comprise 60 to 80% by weight $Fe^{2+}(Fe^{3+}_yAl^{3+}_{1-y})_2O_4$, 15-40% by weight $SiO_2$ and 4 to 8% by weight potassium. The extrudates of the invention exhibit surface area of not less than 130 $m^2$/gram, e.g., between 150 and 220 $m^2$/gram; pore volume of not less than 0.23 $cm^3$/gram, e.g. between 0.25 and 0.40 $cm^3$/gram, and average pore diameter between 6.0 and 8.0 nm. Elemental analysis by means of energy dispersive X-ray spectroscopy of the catalyst indicates that the weight ratio Fe:Al is in the range from 100:20 to 100:30. Analytical techniques and instruments used for the measurements reported herein are as described in WO 2014/111919.

Extrudates of 1.6 mm diameter prepared according to the invention display good mechanical properties, that is, a crush strength measured by Quantachrome Crush Strength Analyzer CSA-2 ranged from 11 to 26 N/mm, e.g., from 15 to 22 N/mm, and crushing force/circumference from 5 to 8 N/mm.

In use, the pellets (e.g., extrudates) are loaded into a suitable reactor, e.g., a continuous fixed bed reactor. The thickness of the catalyst layer packed in the reactor may vary within the range of 7 cm to 12 m, typically from 1 m to 12 m, provided the size of the pellets is chosen so as to avoid a significant pressure drop. As pointed out above, the extrudates of the invention finds utility in a wide range of processes for preparing hydrocarbons from different feedstock materials, and in particular, the extrudates can effectively advance the conversion of carbon dioxide by hydrogenation to hydrocarbons, the conversion of carbon monoxide by reaction with steam to hydrocarbons and the conversion of $H_2$-lean syngas (the product of dry reforming of natural gas) into hydrocarbons. These three types of reactions shall now be described in detail.

Hydrogenation of Carbon Dioxide to Form Hydrocarbons

In order to be operative in hydrogenation of carbon dioxide to form hydrocarbons, the extrudates need first to undergo activation. The activation of the extrudates is carried out in-situ, by either reduction (hydrogenation) or carburization.

Reduction involves the flow of hydrogen stream through the reactor in which the extrudates are placed at a temperature of not less than 400° C. The flow rate of the hydrogen stream is not less than 20 cm$^3$/min per gram of extrudates. The reduction is continued at atmospheric pressure for not less than 3 hours.

Carburization involves the exposure of extrudates to a carbon-containing atmosphere. To this end, streams of carbon monoxide, hydrogen and an inert gas carrier are caused to flow through the reactor in which extrudates are placed at a temperature of not less than 300° C. The flow rates of the three gaseous components (CO, $H_2$ and inert gas ($N_2$, He, Ar)) are at least 30:30:150 cm$^3$/min per one gram of the extrudates, respectively. The carburization is continued at atmospheric pressure for not less than 3 hours.

Following the in-situ activation of the extrudates, the carbon dioxide hydrogenation reaction is allowed to start. To this end, carbon dioxide-containing gaseous stream and hydrogen stream are continuously fed to the reactor at $H_2/CO_2$ of not less than 1, e.g., not less than 2, and weight hourly space velocity (WHSV) not less than 0.1 h$^{-1}$, preferably not less than 0.5 h$^{-1}$ and more preferably not less than 1 h$^{-1}$. The reaction is carried out at a temperature in the range from 250 to 360° C. at pressure of not less than 5, e.g., not less 10 atmospheres, e.g., from 20 to 40.

Another aspect of the invention is therefore a process for producing hydrocarbons comprising hydrogenation of carbon dioxide-containing gas stream in the presence of the potassium-promoted $Fe^{2+}(Fe^{3+}_y Al^{3+}_{1-y})_2 O_4$, silica-containing pellets (e.g., extrudates) that were described above.

It should be noted that the carbon dioxide-containing gas stream used in the present invention may be neat carbon dioxide and also any gas mixture which contains carbon dioxide, for example, a mixture of carbon dioxide and carbon monoxide, with the molar fraction of carbon dioxide being not less than 0.25.

The hydrogenation of carbon dioxide-containing gas stream may be carried out in the apparatus illustrated in FIG. 4 of WO 2014/111919, where the reactor configuration is based on a plurality of fixed bed reactors arranged in series. This figure is reproduced below as FIG. 1. With reference to said Figure, the serially-positioned reactors are designated by numerals (1), (2) and (3). Each reactor is provided with a suitable amount of pellets (extrudates) loaded therein. The amount of pellets in each reactor is adjusted to improve conversion and productivity. Alternatively, the total amount of the pellets used in the process may be equally divided between the set of reactors.

Each reactor is provided with a discharge line (4), with a cooler (5), a gas-liquid separator (6) and a liquid-liquid separator (7) positioned successively along said discharge line. Each liquid-liquid separator (7) is connected to two tanks, (8) and (9), for collecting organic and aqueous phases, respectively. The gas-liquid separator is connected by means of a feed line (10) to the consecutive reactor.

Carbon dioxide, hydrogen and optionally carbon monoxide required for the process are supplied through feed lines (11), (12) and (13), respectively. Hydrogen may be produced by the electrolysis of water in an electrolysis unit (not shown) and carbon dioxide may be recovered from industrial processes such as the combustion of fossil fuels in power generating plants, cement or steel plants. Another useful source of the reactans required for the process is carbon dioxide-rich syngas, i.e., a gas mixture comprising $CO_2$, $H_2$ and CO where the concentration of $CO_2$ is greater than the normal concentration in conventional syngas, i.e., the molar fraction of carbon dioxide in the syngas is not less than 0.25 and preferably not less than 0.5.

In the specific embodiments shown in FIG. 1, separate $CO_2$, $H_2$ and CO feeds are shown, equipped with flow controllers (14), and the gases are combined in a feed line (15) and introduced into the first reactor. While the description that follows relates to the embodiment illustrated in FIG. 4 of WO 2014/111919, it should be noted that a combined gaseous stream, e.g., carbon dioxide-rich syngas, may be utilized.

In operation, carbon dioxide (11) and hydrogen (12), and optionally carbon monoxide (13) streams are fed to the first of said serially arranged reactors, with their relative amounts being adjusted by means of flow controllers (14). As shown in FIG. 1, hydrogen may be directly fed also to each of the successive reactors by means of feed lines (15, 16) equipped with flow controllers (14), so as to maintain an optimal ratio between the gaseous reactants. For example, $CO_2$, $H_2$ and CO may be fed at molar ratios 1:5:1.

The temperature and pressure maintained within each of the serially-placed reactors are as set forth above, and the preferred WHSV is not less than 0.5 h$^{-1}$.

The gaseous mixture produced at each reactor is discharged (4), and subjected to cooling and condensation (5) whereby a liquid-gas mixture is obtained. This mixture is separated into its liquid and gaseous components in a gas-liquid separator (6).

The gaseous, non-condensable component, which consists of non-reacted $CO_2$, $H_2$ and CO with light organic compounds is removed from the liquid component and fed directly to the next reactor via line (10). The liquid component is fed to a liquid-liquid separator (7), where it is separated into organic and aqueous phases, which are collected in two distinct tanks. The organic product (8) (containing mainly alkanes and alkenes with 6-20 carbon atoms in their molecules) is further processed to produce high-quality liquid fuels and chemicals by methods known in the art. As shown in FIG. 1, a further separation may be conducted after the third stage, to separate liquids from non-condensable products.

Reaction of Carbon Monoxide and Steam to Form Hydrocarbons

The reaction is represented by the following chemical equation:

$$3CO + H_2O \rightarrow -CH_2- + 2CO_2$$

where —$CH_2$— collectively denotes the mixture of hydrocarbons formed. Several catalysts were tested for advancing this reaction, with the major goal being to increase the selectivity to liquid hydrocarbons ($C_{5+}$).

The use of Ru/$Al_2O_3$, Ru/$SiO_2$ [B. L. Gustavson, J. H. Lunsford, J. Catal., 74, p. 393, (1982)] or Rh/zeolite Y [N. Niwa, T. Tizuka, J. H. Lunsford, J. C. S. Chem. Commun, p. 685, (1979)] at 280° C. yielded only methane as hydrocarbon product with >96% CO conversion and 8-19% selectivity. In the presence of Ni(Co)$Fe_2O_3$ catalyst deposited on $SiO_2$, $TiO_2$ or $ZrO_2$ at CO/$H_2O$ ratio of 3 and temperature of 300° C., CO conversion up to 80% was reported, with selectivity to hydrocarbons and coke of about 11-24% [F. P. Larkins, A. Z. Khan. Appl. Catal. 47, p. 209, (1989)]. However, the share of $C_4$-$C_8$ hydrocarbons was only 36%. Ni/kieselguhr catalyst in a fixed-bed reactor at 240° C. and CO/$H_2O$ ratio varying in the range from 1-4.3 led to CO conversion of up to 51.5%, with selectivity to $CH_4$>27% and selectivity to $CO_2$>54.4% [A. L. Chaffee, H. J. Loeh. Appl. Catal. 26, p. 123, (1986)]. The so-formed product consists of a mixture of aliphatics, olefins and monoaromatics, with a distribution dependant on the CO/$H_2O$ ratio at the reactor inlet. With the aid of $Fe_2O_3$ powder catalyst, it was possible to reach 67.5% CO conversion at 300° C. and CO/$H_2O$ ratio of 3 [Y. Miyata, M. Akimoto, N. Ooba, E. Echigoya, Bull. Chem. Soc. Jap. 57, 667, (1984)]. The authors describe experiments conducted in a fixed-bed reactor, reporting hydrocarbons yield of 1.7-3.4%, with $C_5$-$C_8$ hydrocarbons content of 18% and no higher molecules present. Application of 5% CdO/$Al_2O_3$-Clay catalyst at 385° C. in a batch experiment with catalyst loaded to autoclave and pressurized with $H_2O$/CO/$CO_2$ mixture yielded 0.011 gram hydrocarbons per gram catalyst after 68 h, with 53% $C_{5+}$ content (U.S. Pat. No. 4,559,363). At high CO/$H_2O$ ratio of 4.5 and temperature of 300° C., 10% $Tl_2O_3$/$Fe_2O_3$ catalyst yielded in a fixed-bed reactor 78% CO conversion with selectivity to hydrocarbons of 48% (U.S. Pat. No. 4,565,831). The so-formed hydrocarbons consist of 46.3% $C_5$-$C_{13}$ molecules, 14.1% $C_{13+}$ and 20.3% monoaromatics.

The experimental work reported below indicates that the extrudates of the invention are useful as catalysts in the reaction of carbon monoxide with steam. To this end, the extrudates of the invention undergo activation. The activation of the extrudates is carried out in-situ, by reduction (hydrogenation). Reduction involves the flow of hydrogen stream through the reactor in which extrudates are placed at a temperature of not less than 400° C. The flow rate of the hydrogen stream is as high as 20 cm$^3$/min per gram of extrudates. The reduction is continued at atmospheric pressure for not less than 3 hours. After that the reaction of carbon monoxide with steam is allowed to start; temperature is adjusted according to the reaction conditions and a CO/$H_2O$ mixture is fed to the reactor. Streams of carbon monoxide and steam are continuously fed to the reactor at $H_2O$:CO molar ratio of not less than 0.2:1, e.g., preferably from 0.3:1 to 0.4:1, and weight hourly space velocity (WHSV) of not less than 0.1 h$^{-1}$, preferably from 0.4 to 2 h$^{-1}$. The reaction is carried out at a temperature in the range from 250 to 340° C. (for example, 250 to 290° C.), at pressure of not less than 15 atmospheres, e.g., from 20 to 50 atm at the reactor inlet.

An exemplary apparatus suitable for carrying out the reaction of carbon monoxide and steam may have an arrangement similar to the experimental set-up that is described in detail the Examples below in reference to FIG. 2. The apparatus shall now be described in more general terms in connection with FIG. 7. As shown in FIG. 7, the apparatus includes at least one reactor (30) with a configuration suitable for heterogeneous solid-catalyzed reactions. Carbon monoxide (31) and steam (32) required for the process are supplied to the reactor via feed lines equipped with flow controllers. The outlet of the reactor is connected to a discharge line provided with at least one cooler (34) and one gas-liquid separator (35) coupled to said cooler. Preferably, the apparatus comprises an array of n successively positioned coolers (cooler$_1$, cooler$_2$, . . . , cooler$_n$) each associated with a gas-liquid separator (gas-liquid separator$_1$, gas-liquid separator$_2$, . . . , gas-liquid separator$_n$, respectively). Non-condensable matter withdrawn from a gas-liquid separator is passed via a conduit to a cooler placed downstream to said gas-liquid separator (namely, cooler$_{i+1}$ receives non-condensable materials from gas-liquid separator$_i$). Each of the gas-liquid separators is either directly or indirectly in fluid communication with a vessel for collecting an organic liquid, with at least one of the gas-liquid separators being connected to a liquid-liquid separator for carrying out a separation of a liquid mixture into its organic and aqueous components.

For example, the apparatus of FIG. 7 comprises a first cooler (34) and a second cooler (36), each coupled to a gas-liquid separator, i.e., to a first gas-liquid separator (35) and a second gas-liquid separator (37), respectively, with either the first gas-liquid separator (35), the second gas-liquid separator (37) or both, being in fluid communication with a liquid-liquid separator (38) to enable the separation of a liquid mixture into organic and aqueous phases.

The gaseous mixture produced at the reactor (30) is discharged. On cooling the mixture with the aid of a first cooler (34) to a temperature $T_1$ ($T_1$>100° C.) and condensation, a first gas-liquid mixture is formed, which is separated in (35) into a first liquid component and a first gaseous component.

The first liquid component may consist of both aqueous and organic phases. The first liquid undergoes separation in a liquid-liquid separator (38) into organic and aqueous phases, following which the heavy organic compounds produced by the process are collected (39), e.g., linear alkanes and alkenes with 7-40 carbon atoms. This organic liquid constitutes the major product of the process and can be processed to give high-quality liquid fuels or chemicals by methods known in the art. Water may be also collected (in vessel (40)).

The first gaseous component discharged from (35) contains non-reacted CO, $H_2$, and $CO_2$ with light organic compounds. It flows to a successively placed cooler (36). On further cooling to a temperature $T_2$ ($T_2$<10° C.) in said second cooler (36), a second gas-liquid mixture is formed, which is separated in a second gas-liquid separator (37) into a second liquid component and a second gaseous component. The liquid component consists of an organic phase to be collected (in vessel (41)).

Thus, another aspect of the invention comprises a process for preparing liquid hydrocarbons, comprising contacting carbon monoxide-containing gas stream with steam in the presence of the potassium-promoted $Fe^{2+}(Fe^{3+}_y Al^{3+}_{1-y})_2O_4$, silica-containing pellets that were described above, and collecting the liquid hydrocarbons formed.

It should be noted that the carbon monoxide-containing gaseous stream is not necessarily neat CO and may contain, in addition to carbon monoxide, also carbon dioxide up to molar fraction of 0.25, e.g., a feedstock consisting of $CO:CO_2$ mixture with a molar ratio of more than 3:1, e.g., more than 4:1, is perfectly acceptable: the experimental results reported below clearly show that the process of the invention runs swiftly in the presence of carbon dioxide in the feedstock material.

It is also noted that the conversion of carbon monoxide to hydrocarbons is achieved without feeding a stream of hydrogen reactant to the reactor where the reaction takes place. In other words, the process contemplates the use of substantially hydrogen-free carbon monoxide-containing gaseous stream and steam. However, the inclusion of hydrogen is possible, for example, up to molar $H_2:CO$ of 0.25 and even up to 0.5 (as shown by (33) in FIG. 7).

Converting $H_2$-Lean Syngas to Hydrocarbons

According to this embodiment of the invention, the extrudates are used to catalyze the conversion of $H_2$-lean syngas ($H_2/CO \le 1$) to hydrocarbons. The $H_2$-lean syngas may be obtained by dry reforming of natural gas.

It is known that natural gas is converted to liquid fuels by a two-stage process, called gas to liquid (GTL): steam or autothermal reforming conducted on nickel-based catalysts to generate syngas at $H_2/CO=2$ followed by Fischer-Tropsch synthesis (FTS) conducted on cobalt- or iron-based catalysts (David A. Wood, Chikezie Nwaoha, Brian F. Towler, Journal of Natural Gas Science and Engineering, 9 196-208 (2012)). Steam reforming consists of three main reactions that take place in the process:

|  | $\Delta H_{298K}$ (kJ/mol) |
|---|---|
| R1. Steam reforming $CH_4 + H_2O \leftrightarrow CO + 3H_2$ | 206.2 |
| R2. Steam reforming $CH_4 + 2H_2O \leftrightarrow CO_2 + 4H_2$ | 164.9 |
| R3. Water gas shift $CO + H_2O \leftrightarrow CO_2 + H_2$ | −41.1 |

Feed of the autothermal reforming process contains oxygen thus combustion also takes place:

Total combustion $CH_4 + 2O_2 \leftrightarrow CO_2 + 2H_2O - 802.7$      R4.

The reforming processes are designed so as to adjust the $H_2/CO=2$, suitable for the FTS.

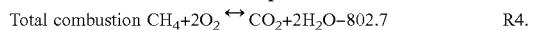
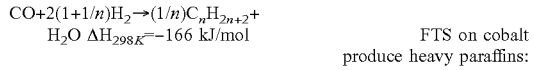

FTS on cobalt produce heavy paraffins:

while iron catalysts produce mostly olefins, paraffins and some oxygenates. Furthermore, iron catalysts are also active in water gas shift thus can operate with syngas that contains $H_2/CO \le 2$.

Carbon dioxide is a greenhouse gas that poses environmental threats. Actually it could serve as a very useful source of carbon for production of fuels. Commercial facilities for $CO_2$ capture have been installed and advanced technologies for low-cost capture have been implemented. The major issue is how to integrate $CO_2$ into the production of liquid fuels and chemicals. One of the most viable routes is to replace the steam with $CO_2$ as the oxidation agent in the reforming of natural gas process called dry-reforming (Yatish T. Shah and Todd H. Gardner, Catalysis Reviews: Science and Engineering, 56, 476-536, 2014):

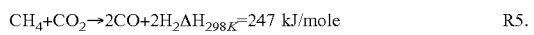     R5.

This process generates a lean hydrogen syngas ($H_2/CO \le 1$) because reverse water gas shift reaction also takes place, reducing the hydrogen content and increasing the CO content. The major challenge is the conversion of this $H_2$-lean syngas to liquid fuels and chemicals. Very little has been published on this topic with no real leads to commercial processes. For example, iron-based catalyst which was tested for this purpose was described by D. B. Bukur et. al [Ind. & Eng. Chem. Res. 1989, 28, 1130].

The conversion of $H_2$-lean syngas to hydrocarbons could gain significant commercial acceptance only if a suitable catalyst is found for this purpose. The experimental results reported below indicate that the extrudates of the invention can be used as catalysts for advancing this reaction.

Accordingly, one aspect of the invention is a process for preparing liquid hydrocarbons, comprising converting carbon monoxide and hydrogen-containing gas stream with a molar ratio $H_2/CO \le 1$ to hydrocarbons in the presence of the potassium-promoted $Fe^{2+}(Fe^{3+}{}_y Al^{3+}{}_{1-y})_2 O_4$, silica-containing pellets (extrudates) that were described above, and collecting the liquid hydrocarbons formed.

According to one embodiment, the molar ratio $H_2/CO$ in the feed stream is in the range of $0.51 < H_2/CO \le 0.8$ (for example, $0.6 \le H_2/CO \le 0.8$).

According to another embodiment, the molar ratio $H_2/CO$ in the feed stream is in the range of $0.01 < H_2/CO < 0.51$ (for example $0.05 \le H_2/CO \le 0.51$ or $0.1 \le H_2/CO \le 0.51$), and water is added to the feed.

The carbon monoxide and hydrogen-containing gas stream used as a feedstock may be $H_2$-lean syngas obtained by dry reforming of natural gas. Thus, more specifically, the invention relates to a process which comprises:

(i) dry reforming of natural gas with carbon dioxide to yield $H_2$-lean syngas ($H_2/CO \le 1$), and optionally adjusting the composition of the so-formed $H_2$-lean syngas by subjecting the gaseous mixture to a reverse water gas shift reaction; and (ii) converting said $H_2$-lean syngas in the presence of the potassium-promoted $Fe^{2+}(Fe^{3+}{}_y Al^{3+}{}_{1-y})_2 O_4$ silica-containing pellets (extrudates) that were described above, to yield liquid hydrocarbons.

The so-formed product hydrocarbons obtained in the second CO hydrogenation step may be upgraded by methods known in the art to produce liquid fuels and chemicals.

Regarding the dry reforming reaction, it is carried out in a reactor with suitable configuration, such as a packed bed reactor (see, for example, ST. C. TEUNER, P. NEUMANN and F. VON LINDE, The Calcor Standard and Calcor Economy Processes, OIL GAS European Magazine 3/2001, 44-46; N. R. Udengaard, J.-H. Bak Hansen, D. C. Hanson, J. A. Stal, Sulfur Passivated Reforming Process Lowers Syngas $H_2/CO$ Ratio, Oil Gas J. 90 (10), (1992) 62). A feed stream consisting of the natural gas (chiefly methane) and carbon dioxide is supplied to the reactor. The ratio carbon dioxide to methane is $CO_2/CH_4 \ge 1$. It is useful to keep this ratio above unity to achieve high stability of the catalyst by avoiding coke formation. Furthermore, the higher this ratio is, the higher the methane conversion and the lower the $H_2/CO$ obtained.

The dry reforming reaction preferably takes place at a temperature between 700 and 1000° C., more preferably between 800 and 950° C., while the pressure is preferably from 1 to 40 atm. The hourly space velocity (WHSV) is not less than 20 NL/g catalyst $h^{-1}$, preferably not less than 30 NL/g catalyst $h^{-1}$ and more preferably not less than 40 NL/g catalyst $h^{-1}$.

Catalysts suitable for promoting dry reforming of methane are known in the art. For example, nickel-based catalysts on support, or catalysts based on noble metals, can be used, such as those described by Guo et al., who reported that dry reforming of methane was successfully achieved over nickel catalysts supported on magnesium aluminate spinels [Applied Catalysis A: General 273, p. 75-82 (2004)]. In the experimental work reported below, Ni-substituted hexaaluminate catalyst with the general formula $BaNi_xAl_{11-x}O_{19-\delta}$ was prepared and used.

It should be noted that theoretically, dry reforming at $CO_2/CH_4=1$ feed composition yields $H_2/CO=1$ in the product (see R5). However the catalyst may display reverse water gas shift activity (see R3). As a result the $CO_2$ conversion is higher than that of methane and $H_2/CO$ in the product is ≤1 with some water being produced. Increasing $CO_2/CH_4$ increases the methane conversion and decreases $H_2/CO$.

The $H_2/CO$ ratio in the syngas can be decreased further to much lower values by separating water from the product and running the gaseous mixture through a commercial reverse water gas shift process. Hence, the composition of the syngas may be modified over the ratio range $0.01 \le H_2/CO \le 1$ by adding a reverse water gas shift process after dry reforming to reduce that ratio to the desired value, producing $H_2$-lean syngas which can serve as a useful feedstock with the aid of a suitable catalyst, that is, the extrudates of the invention, as will now be described in detail.

The conversion of the $H_2$-lean syngas to hydrocarbons may take place in fixed-bed reactor, where the extrudates are placed (e.g., in an apparatus which is essentially similar to that shown in FIGS. 2 and 7). The $H_2$-lean syngas stream is continuously fed to the reactor at weight WHSV of not less than 0.4 $h^{-1}$, preferably not less than 0.5 $h^{-1}$ and more preferably not less than 0.6 $h^{-1}$. The reaction is carried out at a temperature in the range from 270 to 310° C. at pressure of not less than 20 atmospheres, e.g., from 20 to 50. The feed may further contain water, depending on the composition of the $H_2$-lean syngas. If $0.51 \le H_2/CO = \beta \le 1$ (for example, $0.51 < H_2/CO \le 0.8$) then no water needs to be added to the feed. However, if $0.01 \le \beta \le 0.51$, water is added, preferably according to the expression:

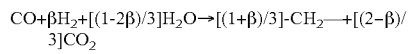

$$CO + \beta H_2 + [(1-2\beta)/3]H_2O \rightarrow [(1+\beta)/3]\text{-}CH_2\text{---} + [(2-\beta)/3]CO_2$$

The hydrocarbons obtained on converting $H_2$-lean syngas with the aid of the catalysts described above can be upgraded, e.g., through catalytic processes under known conditions [Arno de Klerk "Fischer-Tropsch fuels refinery design", Energy Environ. Sci., 2011, 4, 1177].

In another aspect, the invention provides a process comprising dry reforming of natural gas with carbon dioxide to yield $H_2$-lean syngas ($H_2/CO \le 1$), and converting said $H_2$-lean syngas in the presence of a catalyst to hydrocarbons.

IN THE DRAWINGS

EXAMPLES

Example 1

Figure 1:
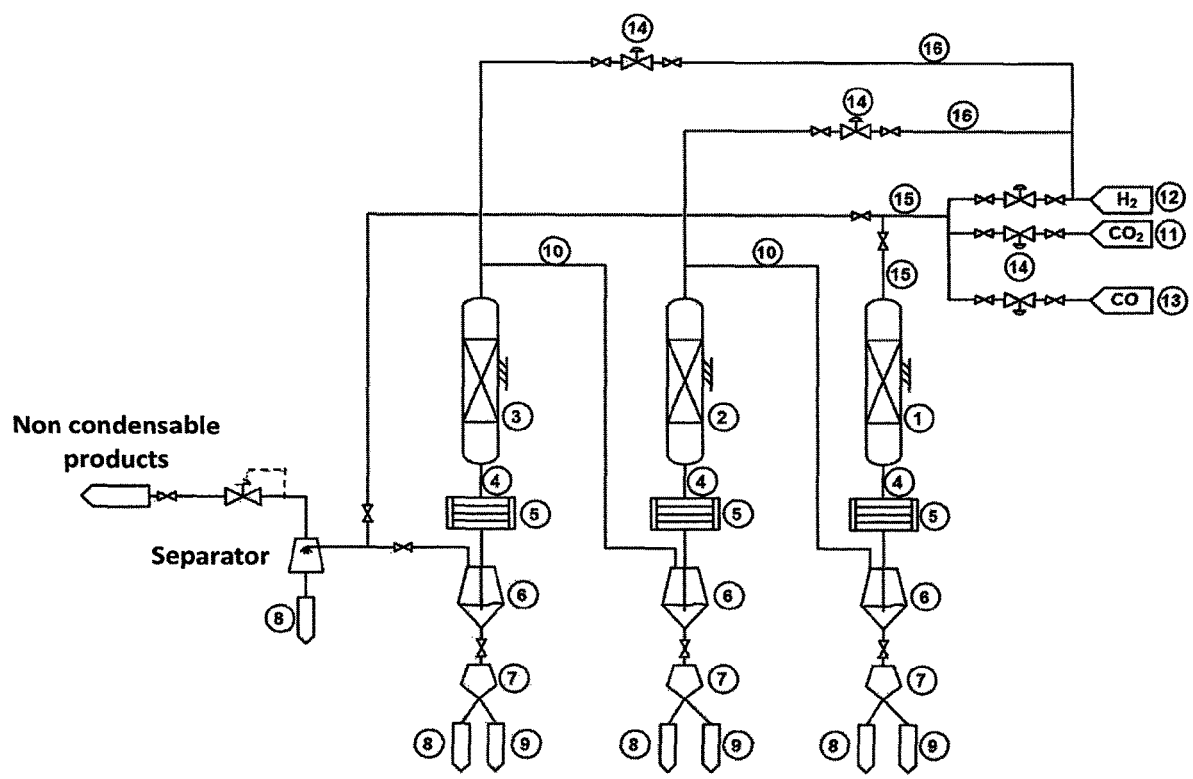
FIG. 1 is a scheme of an apparatus suitable for conducting the hydrogenation of $CO_2$ to form liquid hydrocarbons.

Preparation of Extrudates Consisting of Spinel Phase [$Fe(Fe^{3+}_y Al^{3+}_{1-y})_2O_4$; (y=0.47)] and a Silica Binder Promoted with Potassium The catalytically active compound was prepared by co-precipitation from an aqueous solution of Fe and Al nitrates, induced by the addition of aqueous ammonium hydroxide solution. 27.0 gram of $Al(NO_3)_3 \cdot 9H_2O$ and 57.9 gram of $Fe(NO_3)_3 \cdot 9H_2O$ were dissolved in 60 cm³ of distilled water each. The solutions were then mixed together and the pH of the combined solution was adjusted to 8 by adding 250 cm³ of aqueous $NH_4OH$ solution with concentration of ammonium hydroxide of 5 wt %. The obtained solid was filtered and washed with distilled water and further dried at 110° C. for 24 hours. In the present example the atomic ratio of Fe:Al in the precipitating solution was 2:1. The dried spinel material was grinded using a ball mill to particle size <180 μm, and mixed with $SiO_2$ precursor (Ludox® HS-30) at a weight ratio spinel/$SiO_2$ 70/30 (The $SiO_2$ precursor was brought to pH=7 by few drops of 5M solution of $HNO_3$ in water before the mixing with the spinel powder). The obtained mixture was left for gelation overnight at room temperature. The obtained gel was formed into pellets by extrusion through a die with openings diameter of 2.5 mm, followed by cutting the extruded wire into extrudates with a length of 15 mm (a single-screw extruder was used). The extrudates were aged in air at room temperature for 24 hours. The aged extrudates were dried in air at 110° C. for 6 hours followed by calcination in air at 350° C. for period of 6 hours. No $Fe_2O_3$ hematite phase was formed after calcination at 350° C. The calcined extrudates had diameter of 1.6 mm and length of 6-10 mm. An aqueous solution of $K_2CO_3$ was added by incipient wetness impregnation. The solid was further dried in air at 110° C. for 4 hours followed by calcination in air at 450° C. for period of 3 h. No change in the shape and size of the extrudates was detected at the impregnation step. The material had the following weight ratio of metal components (EDAX):Fe:Al:K=100:24:14.6, surface area 198 m²/gram, pore volume 0.33 cm³/gram and average pore diameter 6.7 nm.

Example 2

Preparation of Extrudates Consisting of Spinel Phase [$Fe(Fe^{3+}_y Al^{3+}_{1-y})_2O_4$; (y=0.47)] and a Silica Binder Promoted with Potassium The catalytically active compound was prepared by co-precipitation from an aqueous solution of Fe and Al nitrates, induced by the addition of aqueous ammonium hydroxide solution. 27.0 gram of $Al(NO_3)_3 \cdot 9H_2O$ and 57.9 gram of $Fe(NO_3)_3 \cdot 9H_2O$ were dissolved in 60 cm³ of distilled water each. The solutions were then mixed together and the pH of the combined solution was adjusted to 8 by adding 250 cm$^3$ of aqueous NH$_4$OH solution with concentration of ammonium hydroxide of 5 wt %. The obtained solid was filtered and washed with distilled water and further dried at 110° C. for 24 hours. In the present example the atomic ratio of Fe:Al in the precipitating solution was 2:1. The dried spinel material was grinded using a ball mill to particle size <180 μm, and mixed-kneaded with SiO$_2$ precursor (Ludox® HS-30) at a weight ratio spinel/SiO$_2$ 70/30 in a horizontal mixing kneader machine equipped with two Z-type blades, heating mantle and a cover for closing it hermetically (The SiO$_2$ precursor was brought to pH=7 in a vessel by few drops of 5M solution of HNO$_3$ in water before addition to kneader; the spinel powder was added to the kneader after addition of SiO$_2$ precursor with adjusted pH). The obtained mixture was mixed-kneaded in the hermetically closed kneader at temperature of 40° C. for 5 h. The obtained gel was discharged from the kneader and formed into pellets by extrusion through a die with openings diameter of 2.5 mm, followed by cutting the extruded wire into extrudates with a length of 15 mm (a single-screw extruder was used). The extrudates were aged in air at room temperature for 24 hours. The aged extrudates were dried in air at 110° C. for 6 hours followed by calcination in air at 350° C. for period of 6 hours. No Fe$_2$O$_3$ hematite phase was formed after calcination at 350° C. The calcined extrudates had diameter of 1.6 mm and length of 6-10 mm. An aqueous solution of K$_2$CO$_3$ was added by incipient wetness impregnation. The solid was further dried in air at 110° C. for 4 hours followed by calcination in air at 450° C. for period of 3 h. No change in the shape and size of the extrudates was detected at the impregnation step. The material had the following weight ratio of metal components (EDAX):Fe:Al:K=100:24:14.6, surface area 203 m$^2$/gram, pore volume 0.31 cm$^3$/gram and average pore diameter 6.1 nm.

In the set of experiments reported in Examples 3 to 5, the hydrogenation of carbon dioxide is illustrated. The extrudate of Example 1 and comparative catalysts were tested for their ability to advance the reaction of carbon dioxide with hydrogen to produce hydrocarbons.

Examples 3 and 4 (Both Comparative)

Carbon Dioxide Hydrogenation in Three Fixed Bed Reactors in Series in the Presence of Binder-Free Pellets and Alumina-Containing Pellets Two experiments were run, using an experimental set-up consisting of three serially positioned SS fixed bed reactors, as illustrated in WO 2014/111919.

In the experiment corresponding to Example 3, the reaction was carried out in the presence of binder-free granules consisting of the spinel Fe$^{2+}$(Fe$^{3+}_{0.47}$Al$^{3+}_{0.53}$)$_2$O$_4$ which were produced by pressing the powdered catalyst in a press at a force of 10 tons, crushing and sieving the granules yielding a material with pellets size in the range 1.2-1.5 mm. Then, 3 g of these pellets (granules) were equally divided between the three reactors of the experimental set-up.

In the experiment corresponding to Example 4, the catalytically active material was employed in the form of alumina-containing pellets, prepared as described in Example 29 of WO 2014/111919 (consisting of 66.6% Fe$^{2+}$(Fe$^{3+}_{0.47}$Al$^{3+}_{0.53}$)$_2$O$_4$, 24.2% Al$_2$O$_3$ and 9.2% K; 3% K was inserted before addition of Al$_2$O$_3$, the rest—after calcination of Al$_2$O$_3$-containing extrudates). Then, 3 g of these pellets were equally divided between the three reactors in the experimental set-up.

In both experiments, all the three reactors were kept at the same temperature (T=300° C.) and total pressure of 10 atm. WHSV of CO$_2$ was 1 h$^{-1}$. H$_2$/CO$_2$ reactants molar ratio was roughly the same for both experiments (3.4 and 3.3, respectively). The experimental protocol is as described in WO 2014/111919 for the three reactors in series configuration. Measurements and calculations of conversion (X), selectivity (S) and productivity (P) are as explained in WO 2014/111919. The results are tabulated in Table 1.

TABLE 1

| Ex. | CO$_2$ WHSV h$^{-1}$ | $X_{CO2}$ % | $S_{CH4}$ % | $S_{CO}$ % | $S_{C2-C4}$ | C$_{5+}$ S % | P (g/g$_{cat}$ · h) · 10$^2$ | C$_{7+}$ oil S % | P (g/g$_{cat}$ · h) · 10$^2$ |
|---|---|---|---|---|---|---|---|---|---|
| 3 | 1 | 59 | 8 | 8 | 23 | 52 | 9.1 | 37 | 6.5 |
| 4 | 1 | 61 | 9 | 10 | 29 | 44 | 7.9 | 29 | 5.2 |

The results shown in Table 1 indicate the inferior performance of binder-containing pellets (with alumina as a binder) in comparison with that of binder-free pellets.

Examples 5 (Comparative) and 6 (of the Invention)

Carbon Dioxide Hydrogenation in a Single Fixed Bed Reactor in the Presence of Binder-Free Pellets and Silica-Containing Extrudates Two experiments were run. In each experiment, CO$_2$ hydrogenation reaction was conducted by passing a mixture of H$_2$ and CO$_2$ flows in a tubular reactor (11 mm ID and 210 mm long, 45 mm catalytic phase) heated up to 330° C. at a total pressure of 20 atm. The WHSV and H$_2$/CO$_2$ reactants molar ratio were roughly the same in these experiments.

In the experiment corresponding to Example 5, the reaction was carried out in the presence of binder-free granules. These granules were produced by pressing Fe$^{2+}$(Fe$^{3+}_{0.47}$Al$^{3+}_{0.53}$)$_2$O$_4$ powder prepared according to Example 7 of WO 2014/111919 which was impregnated with 3% potassium. The powder was pressed at a force of 10 tons, crushed and sieved to give granules. The so-formed granules were sieved to collect 1.2-1.5 mm large granules.

In the experiment corresponding to Example 6, the performance of silica-containing extrudates was tested. These extrudates were prepared as described in Example 1 above, with the following weight composition: 65.8% Fe$^{2+}$(Fe$^{3+}_y$Al$^{3+}_{1-y}$)$_2$O$_4$, 28.2% SiO$_2$, 6% K.

In both experiments, the reaction products were cooled down to +4° C. and separated in cooled (+4° C.) container. Gas products were analyzed in online Agilent 7890A Series Gas Chromatograph equipped with 7 columns and 5 automatic valves using helium as a carrier gas. Liquid products were separated into aqueous and organic phases. Aqueous phase was analyzed for Total Organic Carbon in Shimadzu TOC-V$_{CPN}$ Analyzer. The selectivity of all products was calculated on the carbon basis as $S_i=[C_i/(C_{CO2}*X_{CO2})]*100\%$, where $C_i$ amount of carbon (gram) contained in product (i) produced at period of time, $C_{CO2}$—amount of carbon (gram) contained in $CO_2$ passed the reactor at the same period of time, $X_{CO2}$—$CO_2$ conversion.

The results of the experiments are shown in Table 2. Note the following glossary: $C_{5+}$—hydrocarbons composed of five or more carbon atoms; $C_{i(o)}$—an olefin containing i carbon atoms; $C_{i(p)}$—a paraffin containing i carbon atoms; oxy—oxygen-containing products. The capital letters X and S stand for conversion and selectivity, respectively.

TABLE 2

| Ex. | WHSV (h) | H$_2$/CO$_2$ | X$_{CO2}$ | X$_{H2}$ | S$_{C5+}$ | S$_{C1}$ | S$_{C2\,(o)}$ | S$_{CO}$ | S$_{C3\text{-}C4\,(o)}$ | S$_{C2\text{-}C4\,(p)}$ | S$_{OXy}$ |
|---|---|---|---|---|---|---|---|---|---|---|---|
| 5 | 3.6 | 2.6 | 36 | 41 | 40 | 10 | 6.2 | 12 | 19 | 4.0 | 8.7 |
| 6 | 4.0 | 2.4 | 35 | 46 | 43 | 6.2 | 6.0 | 15 | 17 | 3.1 | 9.3 |

The results indicate that the silica-containing extrudates function better than the binder-free competitors, demonstrating higher selectivity to $C_{5+}$ hydrocarbons concurrently with lower selectivity to the lower alkanes and alkenes.

In the set of experiments reported in Examples 7 to 9, the extrudates of Example 1 was tested for its ability to advance the reaction of carbon monoxide with steam to produce hydrocarbons according to the following conditions.

Figure 2:
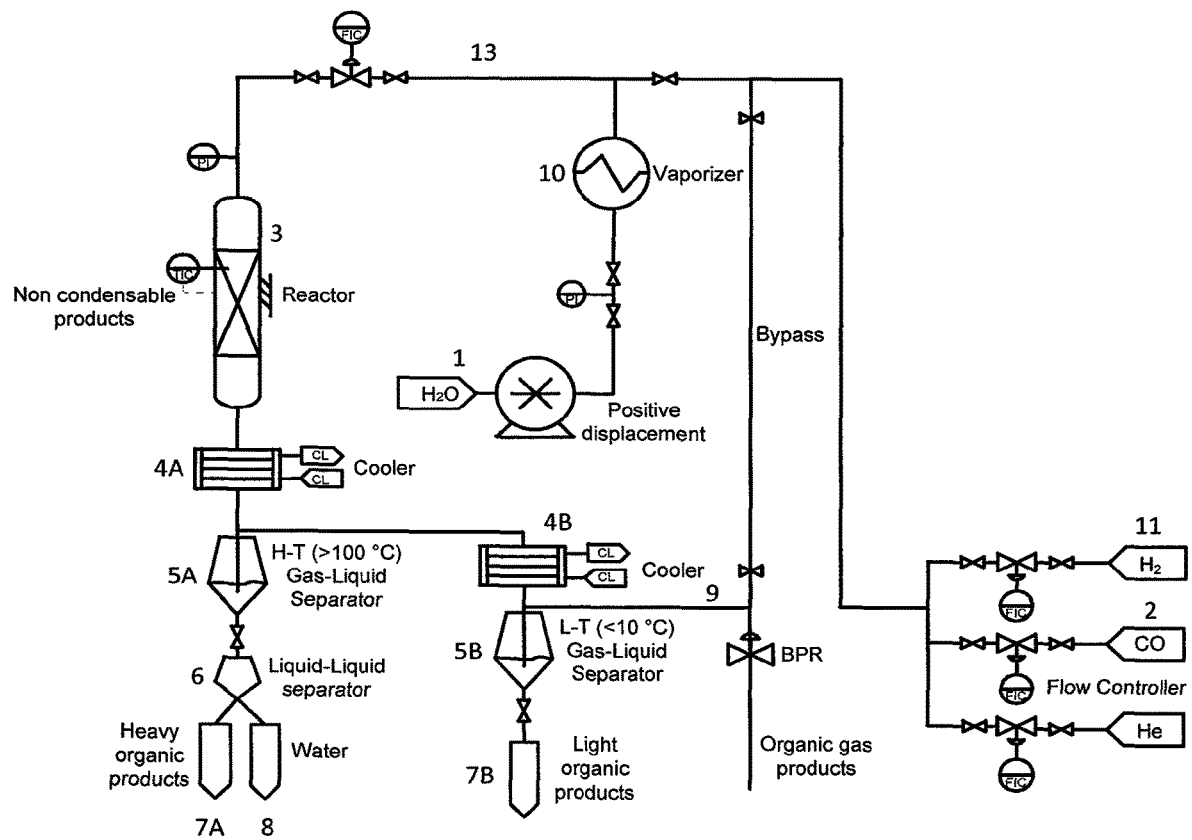
FIG. 2 shows a scheme of an experimental set-up used for conducting the reaction of CO with steam to form liquid hydrocarbons, according to an embodiment of the invention. The same experimental set-up was also used for converting $H_2$-lean syngas into liquid hydrocarbons, according to another embodiment of the invention.

A schematic description of the experimental set-up is shown in FIG. 2. Catalysts activation was done by in-situ reduction in hydrogen at 20 cm$^3$/min*gram$_{cat}$ at temperature of 450° C. and atmospheric pressure in reactor (3), for 4 h. H$_2$ stream supplied for the activation step is also shown (11).

CO reaction with steam was then conducted by passing a mixture of steam and CO streams ((1) and (2), respectively) at a molar ratio 0.35:1 through a tubular reactor (3) (16 mm ID, 250 mm long) packed with 12 gram of the extrudates of Example 1 and heated up to 280° C. at a total pressure of 30 atm. Steam is produced by vaporizing water stream in a vaporizer (10). All gaseous reactants are fed via feed line (13) to the reactor (3).

With the aid of a cooler (4A), the reaction products were cooled down to a temperature T$_1$ (T$_1$>100° C.) to form a first mixture consisting of non-condensable and liquid products. The first mixture is separated in a first gas-liquid separator (5A) into a first liquid component and a first gaseous component.

The first liquid component obtained under the experimental conditions consists of organic and aqueous phases. The first liquid is therefore separated in a liquid-liquid separator (6) into organic and aqueous phases, which are collected in vessels(7A) and (8), respectively.

The first gaseous component is cooled down with the aid of a second cooler (4B) to a temperature T$_2$ (T$_2$<10° C.), undergoing condensation to form a second mixture consisting of non-condensable materials and liquid products. The second mixture is then separated in a second gas-liquid separator (5B) into a second liquid component and a second gaseous component. The second liquid component, consisting of light organic products, is collected in a vessel (7B). The non-condensable components (9) consist of CO$_2$, CO, light hydrocarbons and residual H$_2$ generated by the water gas shift reaction.

Gas products (9) were analyzed in online Agilent 7890A Series Gas Chromatograph equipped with 7 columns and 5 automatic valves using helium as a carrier gas. The liquid composition (7A, 7B) was analyzed by Agilent 190915-433 Gas Chromatograph combined with Mass Spectrometer in the range M/Z=33-500, equipped with 5973 mass selective detector, HP-5MS column (30 m, 250 µm, i.d. 0.25 µm) and helium as a carrier gas. The distillation patterns of the hydrocarbon oil produced were estimated by simulated distillation method based on the maximal boiling points of components in 10 vol % oil fractions. The liquid productivity was calculated based on the weighted amounts of liquid (W$_L$) collected over a specific period of time on stream: $P=W_L/W_{cat}*t$ gram/gram catalyst/h, where W$_{cat}$ is weight of catalyst (gram) loaded into reactor, t—time for collecting W$_L$ (hours). In the tables below, the capital letters X and S stand for conversion and selectivity, respectively. The weight selectivity to CH$_4$, C$_2$-C$_4$ olefins (olefins are abbreviated in the tables below C$_2$= and C$_3$-C$_4$=), C$_2$-C$_4$ paraffins and C$_{5+}$ hydrocarbons was calculated on the carbon basis as $S_i=[C_i/\Sigma C_i*100\%$, where $C_i$ is the amount of carbon (gram) contained in product (i) produced at period of time, $\Sigma C_i$-amount of carbon (gram) contained in all hydrocarbons produced over the same period of time. The selectivity to CO$_2$, $S_{CO2}=F_{CO2}/(F_{CO,0}-F_{CO})$, was calculated as the moles of CO$_2$ produced per moles of CO reacted.

Example 7

Carbon Monoxide Reaction with Steam in a Fixed Bed Reactor in the Presence of Silica-Containing Extrudates The reaction of carbon monoxide with steam to produce hydrocarbons in a fixed bed reactor packed with the catalyst of Example 1 was carried out according to the general procedure set out above, under the following specific conditions:
WHSV$_{CO}$=0.42 h$^{-1}$, Temperature 280° C., total pressure in the reactor inlet 30 atm, H$_2$O/CO=0.34 mol/mol. The time on stream was 506 hours. The results are shown in Table 3.

TABLE 3

| x$_{CO}$, % | x$_{H2O}$, % | S$_{C1}$ wt % | S$_{C2\text{-}C4}$ wt % | S$_{C2}$= wt % | S$_{C3\text{-}C4}$= wt % | S$_{C5+}$ wt % | S$_{CO2}$ mole % | H$_2$/CO outlet |
|---|---|---|---|---|---|---|---|---|
| 83 | 98 | 2.6 | 4.4 | 2.6 | 14 | 76 | 70 | 0.5 |

Figure 3:
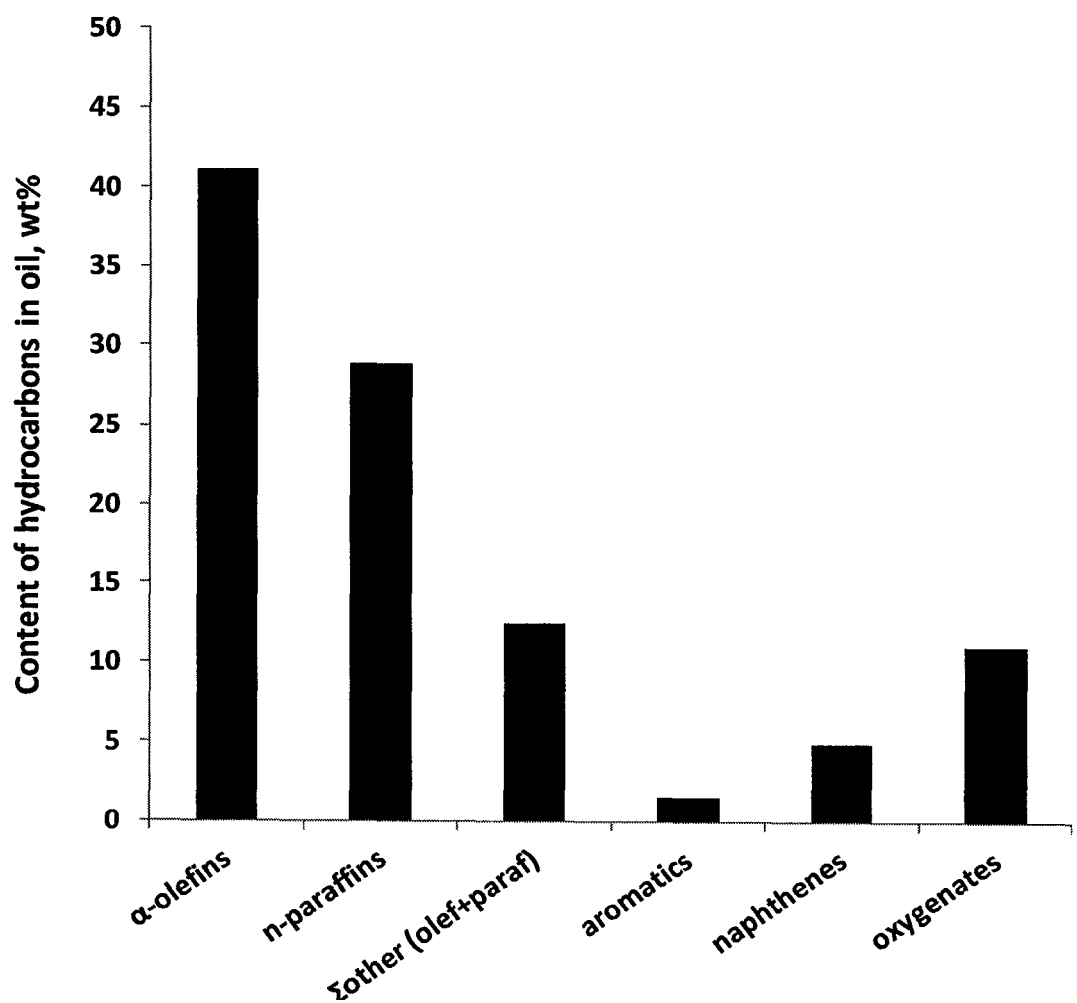
FIG. 3 is a bar diagram showing the content of paraffins, olefins, aromatics, naphthenes and oxygenates in the liquid product obtained on reacting CO with steam.

The composition of the liquid product is shown in FIG. 3 in the form of a bar diagram.

Example 8

Carbon Monoxide (Mixed with Carbon Dioxide) Reaction with Steam in a Fixed Bed Reactor in the Presence of Silica-Containing Extrudates The reaction of carbon monoxide with steam in the presence of CO$_2$, to produce hydrocarbons in a fixed bed reactor packed with the catalyst of Example 1 was carried out according to the general procedure set out above, under the following specific conditions: $WHSV_{CO}$=0.42 h$^{-1}$, Temperature 280° C., total pressure at the reactor inlet 30 atm, H$_2$O/CO=0.34 mol/mol, CO$_2$/CO=0.25 mol/mol. The time on stream was 530 hours. The results are shown in Table 4.

TABLE 4

| $x_{CO}$, % | $x_{H2O}$, % | $s_{C1}$ wt % | $s_{C2-C4}$ wt % | $s_{C2}^=$ wt % | $s_{C3-C4}^=$ wt % | $s_{C5+}$ wt % | $S_{CO2}$ mole % | H$_2$/CO outlet |
|---|---|---|---|---|---|---|---|---|
| 73 | 96 | 0.7 | 3.8 | 4.2 | 15 | 76 | 70 | 0.5 |

Figure 4:
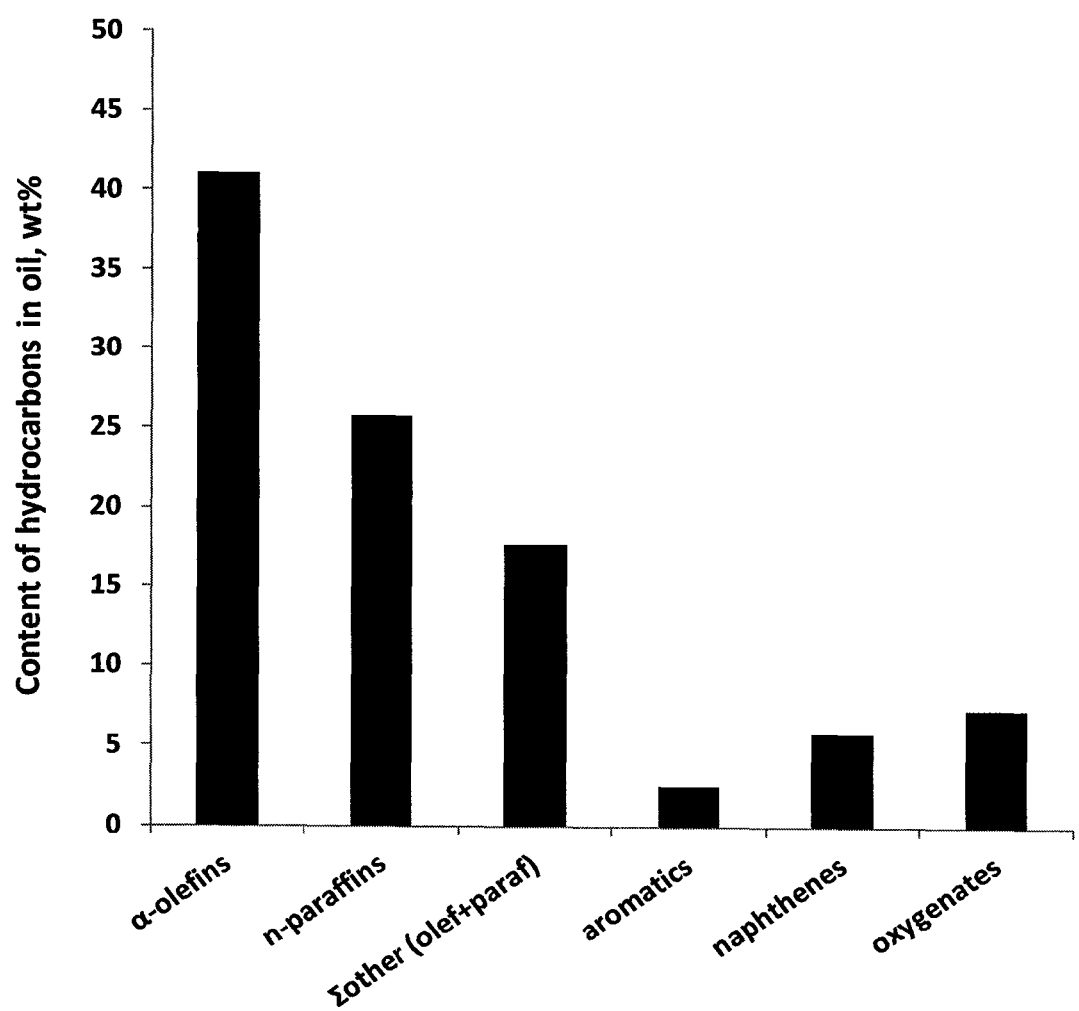
FIG. 4 is a bar diagram showing the content of paraffins, olefins, aromatics, naphthenes and oxygenates in the liquid product obtained on reacting CO with steam.
Figure 5:
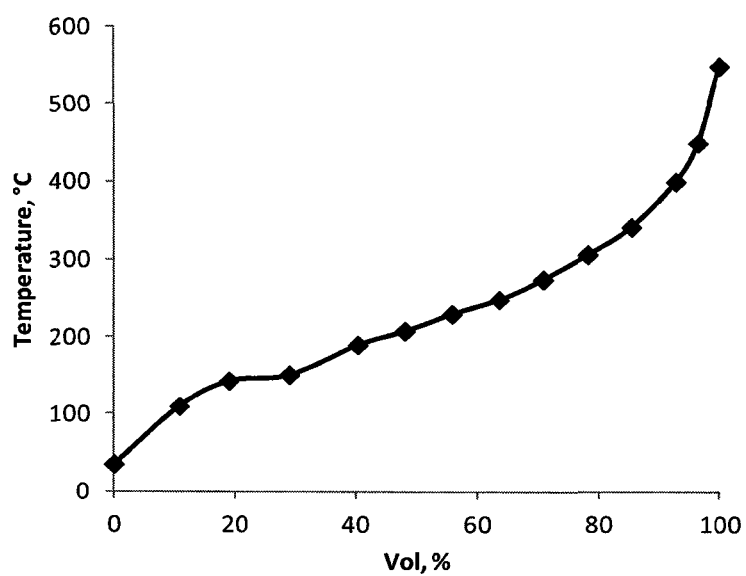
FIG. 5 is a simulated distillation curve of products produced according to Example 8.

The composition of the liquid product is shown in FIG. 4 in the form of a bar diagram. The simulated distillation curve of products is depicted in FIG. 5.

Example 9

Carbon Monoxide (Mixed with Carbon Dioxide) Reaction with Steam in a Fixed Bed Reactor in the Presence of Silica-Containing Extrudates The reaction of carbon monoxide with steam in the presence of CO$_2$, to produce hydrocarbons in a fixed bed reactor packed with the catalyst of Example 1 was carried out according to the general procedure set out above, under the following specific conditions: $WHSV_{CO}$=0.6 h$^{-1}$, Temperature 300° C., total pressure at the reactor inlet 30 atm, H$_2$O/CO=0.34 mol/mol, CO$_2$/CO=0.25 mol/mol. The time on stream was 560 hours. The results are shown in Table 5.

TABLE 5

| $x_{CO}$, % | $x_{H2O}$, % | $s_{C1}$ wt % | $s_{C2-C4}$ wt % | $s_{C2}^=$ wt % | $s_{C3-C4}^=$ wt % | $s_{C5+}$ wt % | $S_{CO2}$ mole % | H$_2$/CO outlet |
|---|---|---|---|---|---|---|---|---|
| 85 | 96 | 3.4 | 4.7 | 4.2 | 23 | 65 | 70 | 0.6 |

The experiments reported in Examples 10 to 13 relate to the conversion H$_2$-lean syngas into hydrocarbons. First, Example 10 shows the generation of H$_2$-lean syngas by dry reforming of natural gas with carbon dioxide with the aid of Ni-containing catalyst (the synthesis of the Ni-containing catalyst is shown in Preparation 1 below). Then, in Examples 11 to 13, the extrudates of Example 1 and 2 according to the invention and comparative extrudates are tested for their ability to advance the conversion of H$_2$-lean syngas into hydrocarbons.

Example 10

Dry Reforming: Carbon Dioxide Reaction with Methane in a Fixed Bed Reactor

Figure 6:
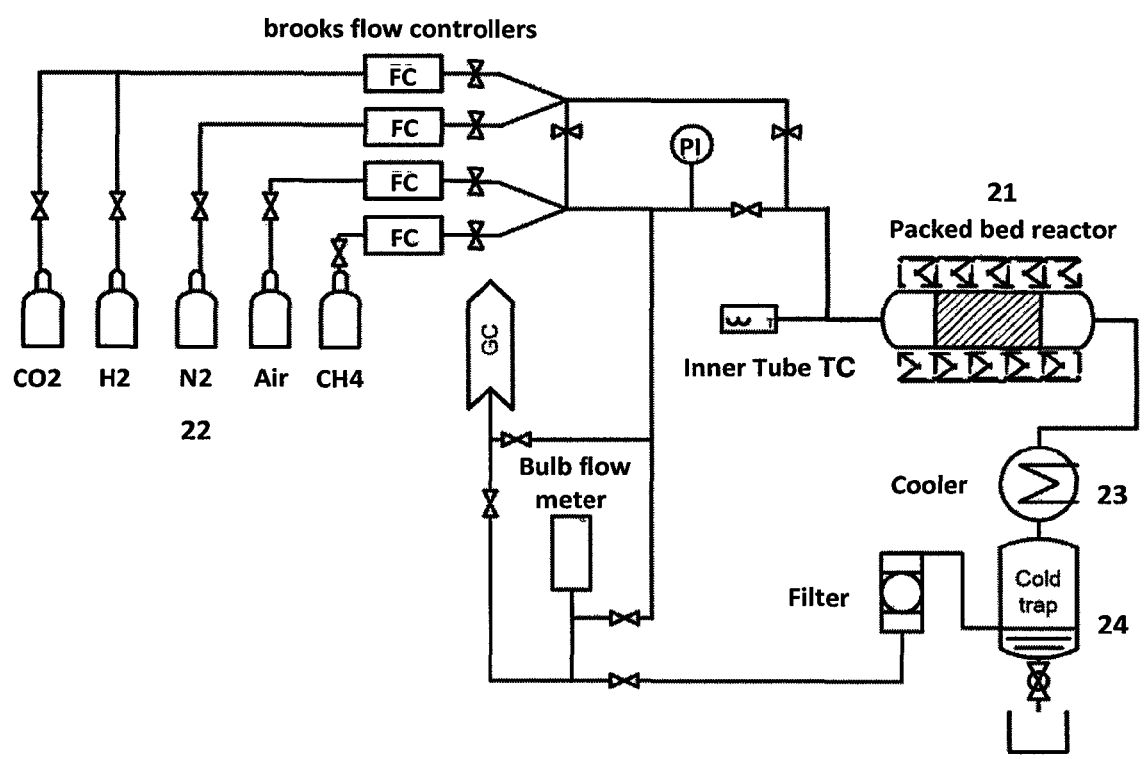
FIG. 6 shows a scheme of an experimental set-up used in the dry reforming of methane with $CO_2$.
Figure 7:
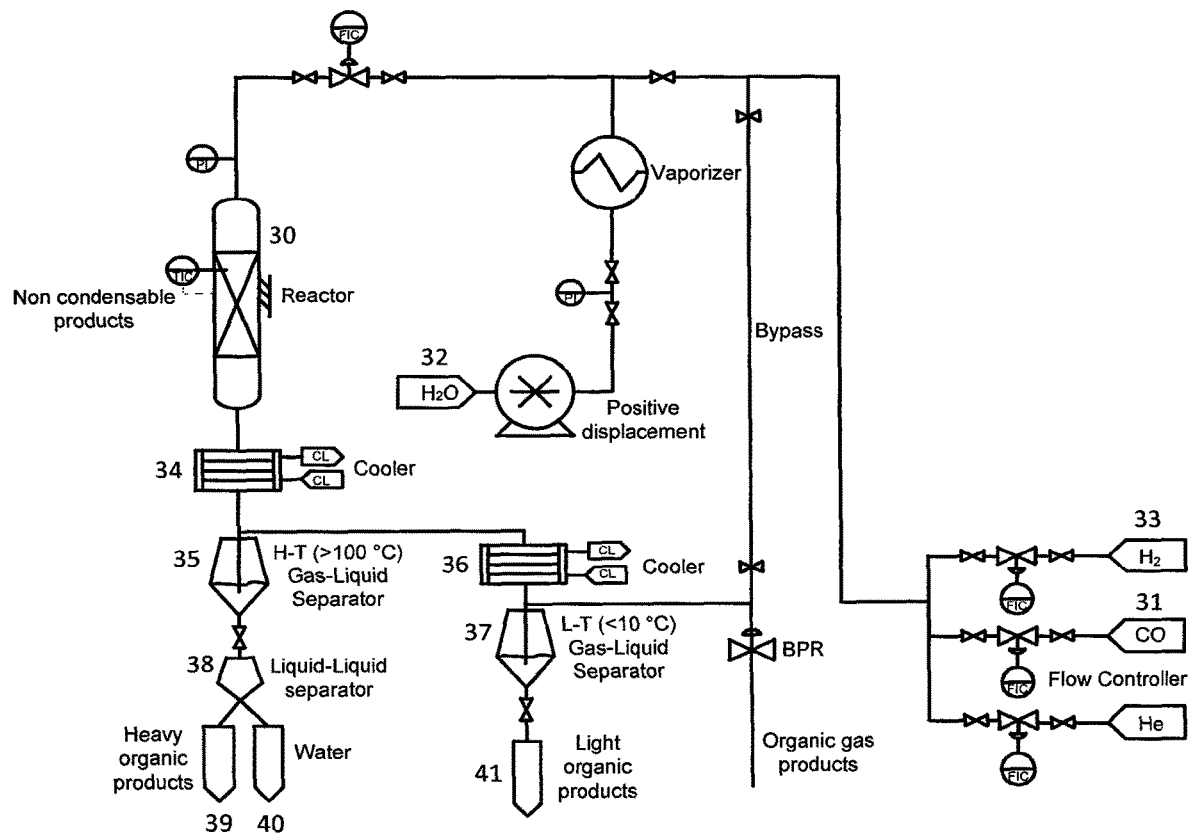
FIG. 7 shows a scheme of an apparatus suitable for conducting the reaction of CO with steam to form liquid hydrocarbons, or converting $H_2$-lean syngas into liquid hydrocarbons.

A schematic description of the experimental set-up is shown in FIG. 6. The catalytic performance of the dry reforming (DR) catalyst (Ni-haxaaluminateBaNiAl$_{11}$O$_{19-\delta}$ of Preparation 1) was measured in stainless steel (0.95 cm I.D.) fixed bed reactor (21) with a central tube (0.31 cm O.D.) equipped with a movable thermocouple for measuring the axial temperature profile. The reactor is heated at the wall by a high temperature electrical heater. The reactor was packed with powder catalyst diluted with SiC powder of ring shape catalyst. Each gaseous reactant flows from cylinders (22) and its rate is controlled by an electronic mass flow controller (FC) (Brooks Co.). Feed and effluent streams were analyzed with an Agilent 7890A GC (GC) equipped with FID and TCD detectors and IR analyzer. Water was condensed (23) from the products gas stream using a cold trap (24) at the outlet of the reactor.

The BaNiAl$_{11}$O$_{19-\delta}$ catalyst of Preparation 1 was used to promote the reaction of methane with carbon dioxide, to produce H$_2$-lean syngas. 0.2 g of the catalyst of Preparation 1 in powdered form (106-150 µm) diluted with 0.2 g SiO$_2$ was loaded into the reactor. A gas mixture containing CH$_4$ and CO$_2$ was fed to the reactor. The catalyst was reduced at 900° C. for 1 h in a 60% H$_2$-40% N$_2$ mixture flow.

The dry reforming of methane was conducted with the catalyst described in Preparation 1 at atmospheric pressure and 870° C. The feed was composed of 66 mol % CO$_2$ and 34 mol % CH$_4$. Running at 15 NL/g catalyst/h yielded 99% and 66% conversion of methane and CO$_2$ respectively with H$_2$/CO=0.6 in the product.

Examples 11 and 12 (of the Invention) and 13 (Comparative)

Carbon Monoxide Reaction with Hydrogen in a Fixed Bed Reactor

A schematic description of the experimental set-up is shown in FIG. 2. Catalysts activation was done by in-situ reduction in hydrogen at 20 cm$^3$/min*gram$_{cat}$ at temperature of 450° C. and atmospheric pressure in reactor (3), for 4 h.

CO was contacted with H$_2$ and optionally with steam by passing a mixture of CO, H$_2$ and optionally H$_2$O streams (indicated by numerals (2), (11) and (1), respectively) through a tubular reactor (3) (16 mm ID, 250 mm long) packed with 12 gram of the extrudates of the invention and heated up to 280° C. at a total pressure of 30 atm. Steam is produced by vaporizing water stream in a vaporizer (10). All gaseous reactants are fed via line (13) to the reactor (3).

With the aid of a cooler (4A), the reaction products were cooled down to a temperature T$_1$ (T$_1$>100° C.) to form a first mixture consisting of non-condensable and liquid products. The first mixture is separated in a first gas-liquid separator (5A) into a first liquid component and a first gaseous component.

The first liquid component obtained under the experimental conditions consists of organic and aqueous phases. The first liquid is therefore separated in a liquid-liquid separator (6) into organic and aqueous phases, which are collected in vessels (7A) and (8), respectively.

The first gaseous component is cooled down with the aid of a second cooler (4B) to a temperature T$_2$ (T$_2$<10° C.), undergoing condensation to form a second mixture consisting of non-condensable materials and liquid products. The second mixture is then separated in a second gas-liquid separator (5B) into a second liquid component and a second gaseous component. The second liquid component, consisting of light organic products, is collected in a vessel (7B). The non-condensable components (9) consist of CO$_2$, CO, light hydrocarbons and residual H$_2$ generated by the water gas shift reaction.

Products were analyzed as described in the previous set of Examples. In the tables below, the capital letters X and S stand for conversion and selectivity, respectively. The weight selectivity to CH$_4$, C$_2$-C$_4$ olefins (olefins are abbreviated in the tables below C$_2^=$ and C$_3$-C$_4^=$), C$_2$-C$_4$ paraffins and C$_{5+}$ hydrocarbons was calculated on the carbon basis as $S_i=[C_i/\Sigma C_i*100\%$, where $C_i$ is the amount of carbon (gram) contained in product (i) produced at period of time, $\Sigma C_i$— amount of carbon (gram) contained in all hydrocarbons produced over the same period of time. The selectivity to $CO_2$, $S_{CO2}=F_{CO2}/(F_{CO,0}-F_{CO})$, was calculated as the moles of $CO_2$ produced per moles of CO reacted.

In Example 11, the reaction of carbon monoxide with hydrogen to produce hydrocarbons was run in the experimental set-up described above, using the extrudate of Example 1, under the following specific conditions: $WHSV_{CO}=0.67$ $h^{-1}$, temperature 280° C., total pressure at the reactor inlet 30 atm, $H_2/CO=0.25$ mol/mol, $H_2O/CO=0.23$ mol/mol. The time on stream was 280 hours. The results are shown in Table 7.

TABLE 7

| $x_{CO}$, % | $x_{H2O}$, % | $s_{C1}$ wt % | $s_{C2-C4}$ wt % | $s_{C2}^=$ wt % | $s_{C3-C4}^=$ wt % | $s_{C5+}$ wt % | $S_{CO2}$ mole % | $H_2/CO$ outlet |
|---|---|---|---|---|---|---|---|---|
| 80 | 96 | 5.8 | 6.6 | 2.9 | 15 | 69 | 60 | 0.6 |

In Example 12, the reaction of carbon monoxide with hydrogen to produce hydrocarbons was run in the experimental set-up described above, using the extrudates of Example 2, under the following specific conditions: $WHSV_{CO}=0.91$ $h^{-1}$, Temperature 280° C., total pressure in the reactor inlet 30 atm, $H_2/CO=0.7$ mol/mol. The results are shown in Table 8 (TOS indicates time on stream).

TABLE 8

| TOS h | $x_{CO}$, % | $x_{H2}$, % | $s_{C1}$ wt % | $s_{C2-C4}$ wt % | $s_{C2}^=$ wt % | $s_{C3-C4}^=$ wt % | $s_{C5+}$ wt % | $S_{CO2}$ mole % | $H_2/CO$ outlet |
|---|---|---|---|---|---|---|---|---|---|
| 170 | 91 | 80 | 6.2 | 6.1 | 3.4 | 13.3 | 70 | 48 | 1.6 |
| 290 | 90 | 79 | 6.3 | 6.5 | 3.2 | 13.0 | 70 | 48 | 1.4 |

In Example 13, a comparative catalyst prepared as described in Preparation 2 was tested for its ability to advance the reaction of carbon monoxide with hydrogen to produce hydrocarbons. The catalyst was synthesized according to the procedure of D. B. Bukur et. al [Ind. & Eng. Chem. Res. 1989, 28, 1130], formed into silica-containing extrudates by the method of the invention and then tested under to the following conditions: $WHSV_{CO}=0.66$ $h^{-1}$, Temperature 280° C., total pressure in the reactor inlet 30 atm, $H_2/CO=0.7$ mol/mol. The results are shown in Table 9 (TOS indicates time on stream).

TABLE 9

| TOS h | $x_{CO}$, % | $x_{H2}$, % | $s_{C1}$ wt % | $s_{C2-C4}$ wt % | $s_{C2}^=$ wt % | $s_{C3-C4}^=$ wt % | $s_{C5+}$ wt % | $S_{CO2}$ mole % | $H_2/CO$ outlet |
|---|---|---|---|---|---|---|---|---|---|
| 138 | 83 | 74 | 6.7 | 5.6 | 3.4 | 12.1 | 72 | 48 | 1.1 |
| 208 | 79 | 79 | 6.8 | 5.7 | 3.5 | 12.2 | 71 | 48 | 1.0 |

It is seen from the results set forth in Tables 8 and 9 that the extrudates of the invention have better performance than the prior art catalyst, achieving superior CO conversion over a prolonged period of time under higher WHSV.

Preparation 1

Catalyst for Use in Dry Reforming

Ni-substituted hexaaluminate catalyst with the general formula $BaNi_xAl_{11-x}O_{19-\delta}$ was prepared by co-precipitation from a solution of the corresponding metal nitrate salts by addition of ammonium carbonate at pH=7.5-8.0. Metal nitrates were dissolved separately in deionized water at 60° C. The clear solutions of metal nitrates (with the exception of aluminum nitrate) were then mixed together, followed by adjusting the pH value to ~1 with the aid of nitric acid, before adding the aluminum nitrate solution into the metal nitrate mixture. The resulting solution was then poured at 60° C. with vigorous stirring into an aqueous solution containing a large excess of $(NH_4)_2CO_3$ to form the hexaaluminate precursor precipitate. During the precipitation, a large amount of $CO_2$ was released while the pH value of the solution was maintained between 7.5 and 8.0. The resulting slurry was aged with continuous stirring at 60° C. for 3 h followed by filtration and washing with deionized water. The obtained cake was then dried at 110° C. in air overnight. The powder was further calcined at 500° C. for 2 h, followed by calcination at 1300° C. and 1400° C. for 3-5 h.

The resulting powder was crushed and sieved to collect the fraction smaller than 160 μm. XRD analysis yielded the following phases: $Ba_{0.69}Ni_{0.48}Al_{6.36}O_{11}$—95%, $\alpha$-$Al_2O_3$—5%. The BET surface area is 12 cm$^2$/g.

Preparation 2

Comparative Extrudate for Converting $H_2$-Lean Syngas into Hydrocarbons Based on Ind. & Eng. Chem. Res. 1989, 28, 1130

The preparation of Cu—Fe-oxide powder component of extrudates was conducted according to procedure published by D. B. Bukur et. al [Ind. & Eng. Chem. Res. 1989, 28, 1130]. The solid was precipitated at pH=6 by reaction between $Cu(NO_3)_2.2.5H_2O$ (0.22 g), $Fe(NO_3)_2.9H_2O$ (144.7 g) in 596.7 cm$^3$ water with 409 cm$^3$ of 2.7 M aqueous ammonia solution at 82° C. After washing of precipitate with 3 L water and separation by filtration, the material was evacuated at 50° C. for 48 h and then at 120° C. for 18 h. A portion of this dried material was impregnated with aqueous solution of $KHCO_3$, dried in vacuum at 120° C. for 16 h and calcined in air at 300° C. for 5 h yielding a material with composition 100Fe/3Cu/0.2K (atomic composition determined by EDAX analysis). Its surface area was 152 m$^2$/g, pore volume 0.38 cm$^3$/g and according to XRD analysis it contained only one crystalline phase—$\alpha$-$Fe_2O_3$—in full agreement with the results presented by D. B. Bukur for this material [Catal. Today, 1995, 24, 111].

Another portion of the dried material, prepared as described above (15.3 g) was ground using a ball mill to particle size 25-180 μm, and mixed with 21.9 g of $SiO_2$ precursor Ludox® HS-30 (The $SiO_2$ precursor was brought to pH=7 by few drops of 5M solution of $HNO_3$ in water before the mixing with the dried K/Cu—Fe-oxide catalyst powder). The obtained gel was formed into pellets by extrusion through a die with openings diameter of 1.8 mm, followed by cutting the extruded wire in pellets with the length of 15 mm. The extrudates were aged in air at room temperature for 24 hours. The aged extrudates were dried in air at 110° C. for 6 hours followed by calcination in air at 300° C. for period of 3 hours. The calcined extrudates had diameter of 1.6 mm and length of 6-10 mm. An aqueous solution of $KHCO_3$ was added by incipient wetness impregnation at amount yielding 4 wt. % K in extrudates. The solid was further dried in air at 110° C. for 8 hours followed by calcination in air at 300° C. for period of 6 h. No change in the shape and size of the pellets was detected at the impregnation step. The material had following weight ratio of metal components (EDAX): Fe:Cu:K=100:3:5.7, surface area 203 $m^2$/gram, pore volume 0.43 $cm^3$/gram and average pore diameter 8.5 nm.

The invention claimed is:

1. A process for preparing potassium-promoted $Fe^{2+}(Fe^{3+}_{y}Al^{3+}_{1-y})_2O_4$ [$0.3 \leq y \leq 0.7$] silica-containing pellets, comprising subjecting colloidal silica to gelation in the presence of $Fe^{2+}(Fe^{3+}_{y}Al^{3+}_{1-y})_2O_4$ spinel particles, converting the gelled material into pellets and adding potassium to said pellets.

2. A process according to claim 1, wherein the colloidal silica used is an aqueous alkali-stabilized colloidal silica comprising amorphous silica with particle size of up to 50 nm.

3. A process according to claim 1, wherein the $Fe^{2+}(Fe^{3+}_{y}Al^{3+}_{1-y})_2O_4$ spinel used is in the form of a powder with particle size of less than 250 μm.

4. A process according to claim 1, wherein the potassium-promoted $Fe^{2+}(Fe^{3+}_{y}Al^{3+}_{1-y})_2O_4$ silica-containing pellets are potassium-promoted $Fe^{2+}(Fe^{3+}_{y}Al^{3+}_{1-y})_2O_4$ silica-containing extrudates.

5. A process according to claim 4, comprising:
   (i) lowering the pH of an aqueous alkali-stabilized colloidal silica;
   (ii) combining said colloidal silica with $Fe^{2+}(Fe^{3+}_{y}Al^{3+}_{1-y})_2O_4$ spinel particles;
   (iii) allowing the mixture resulting from step (ii) to transform into a gel;
   (iv) adjusting the consistency of said gel to obtain an extrudable mass;
   (v) extruding said mass to form extrudates;
   (vi) drying the extrudates;
   (vii) calcining the dried extrudates;
   (viii) treating the calcined extrudates with an aqueous solution of a potassium salt;
   (ix) drying the potassium-containing extrudates resulting from step (iii); and
   (x) calcining the extrudates resulting from step (ix).

6. A process according to claim 5, wherein in step (i) an acid is added to the aqueous alkali-stabilized colloidal silica to lower the pH to the range from 6.5 to 7.5.

* * * * *